May 3, 1927.
M. BAKER
1,627,007
APPARATUS FOR CUTTING LARD, BUTTER, OR MARGARINE
Filed Jan. 21. 1926　　5 Sheets-Sheet 2
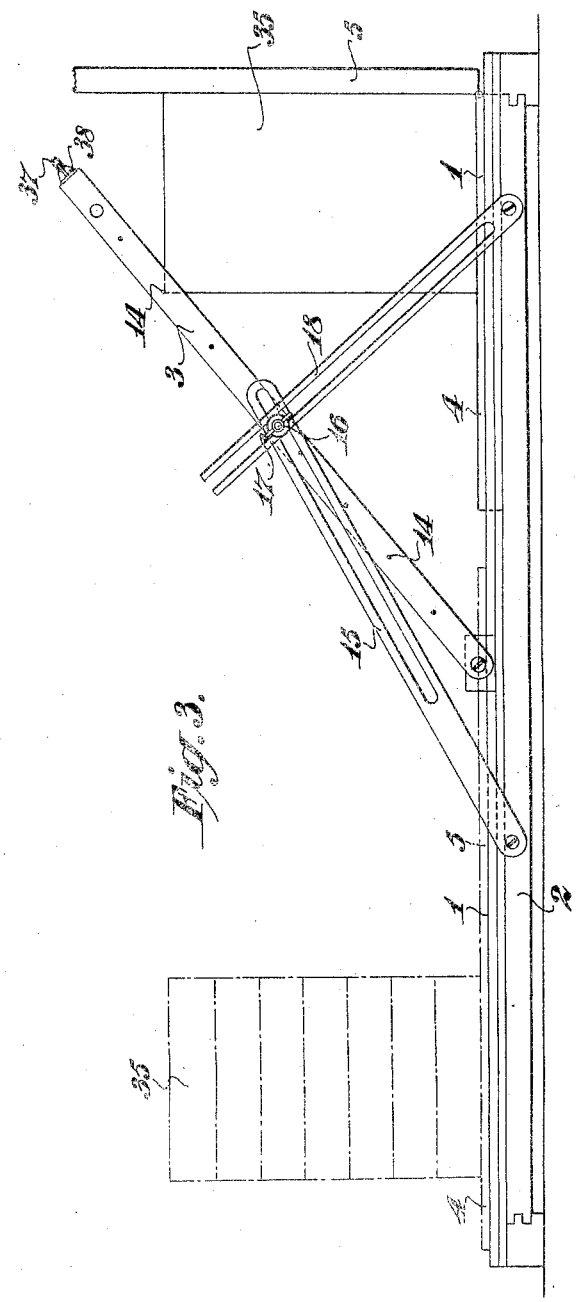
INVENTOR
MARK BAKER May 3, 1927.
M. BAKER
1,627,007
APPARATUS FOR CUTTING LARD, BUTTER, OR MARGARINE
Filed Jan. 21. 1926    5 Sheets-Sheet 3
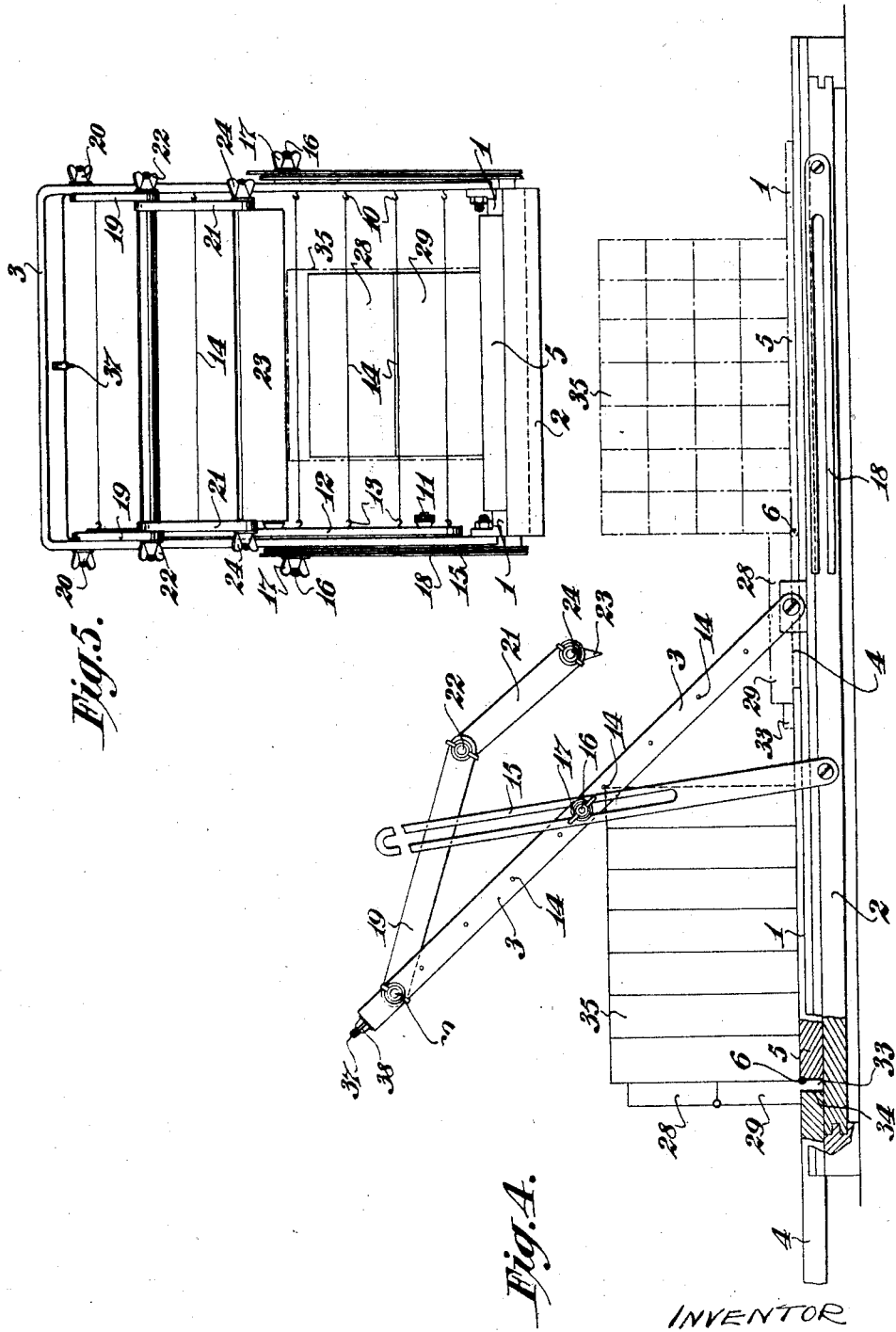

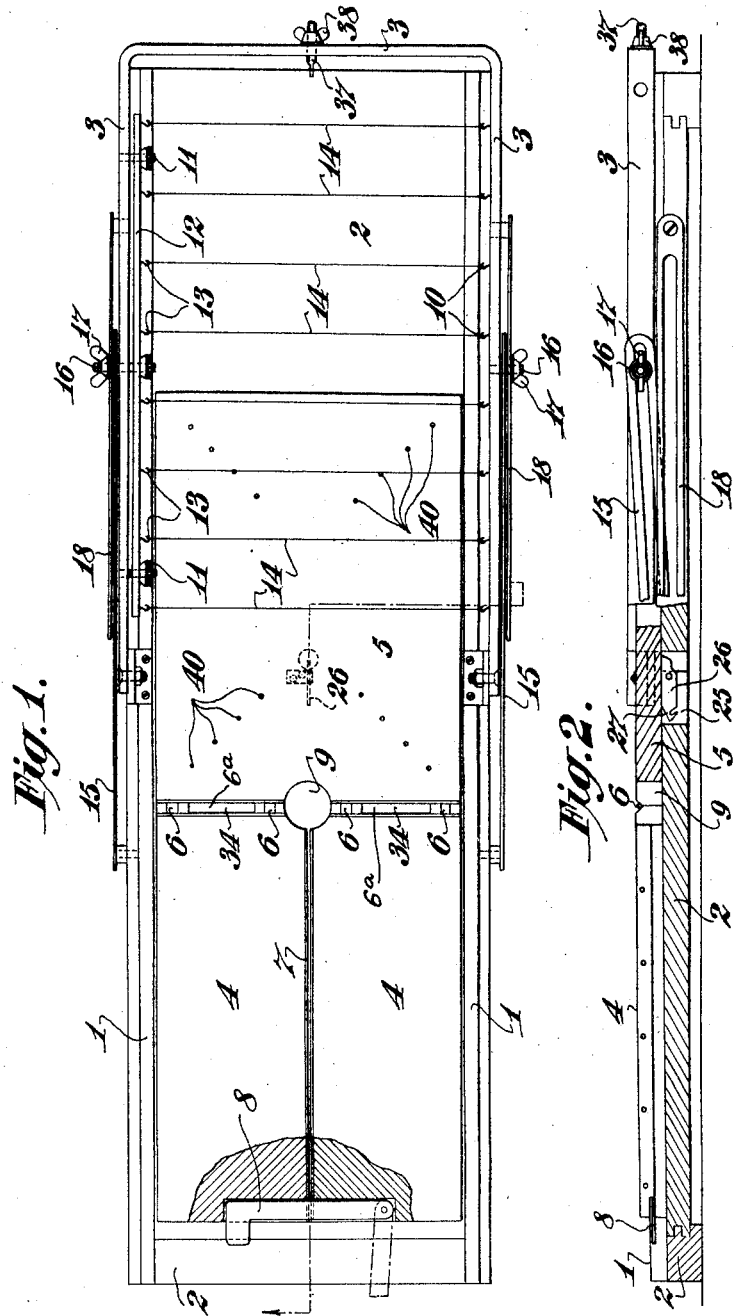

May 3, 1927. 1,627,007
M. BAKER
APPARATUS FOR CUTTING LARD, BUTTER, OR MARGARINE
Filed Jan. 21, 1926   5 Sheets-Sheet 4
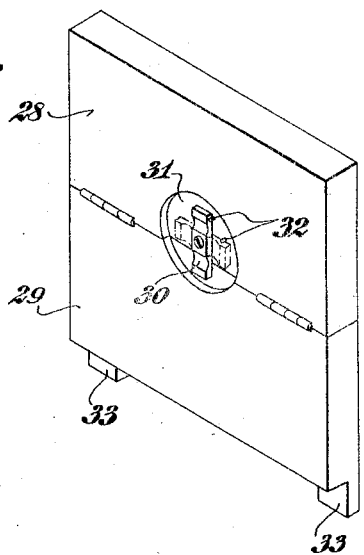
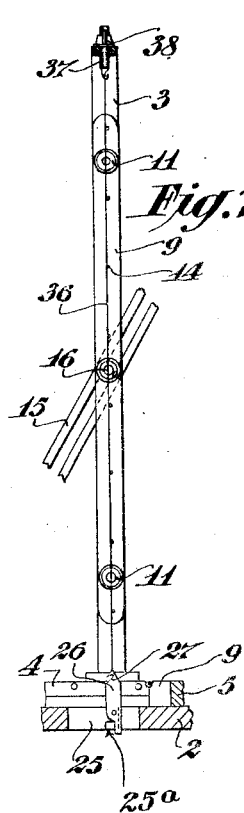
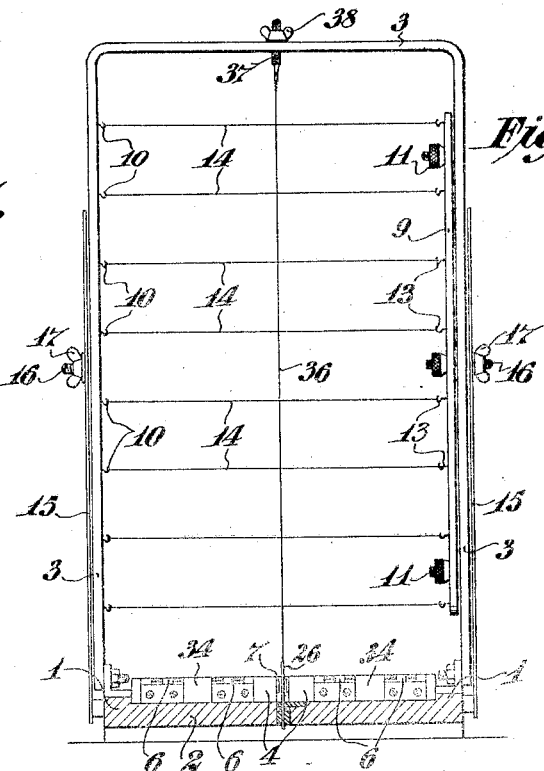
INVENTOR
MARK BAKER

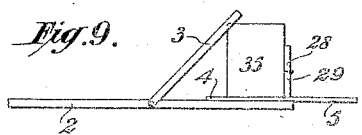
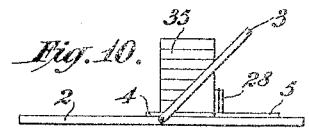
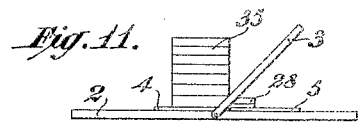
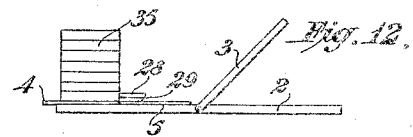
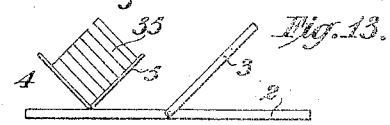
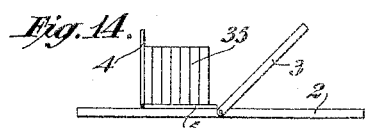
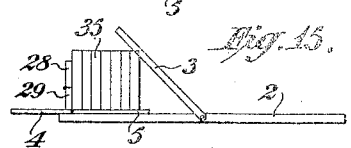
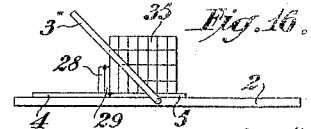
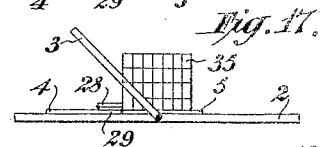
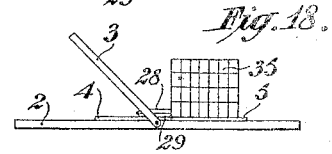
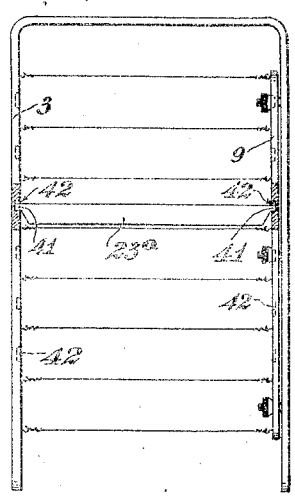

Patented May 3, 1927.

1,627,007

UNITED STATES PATENT OFFICE.

MARK BAKER, OF BOSTON, ENGLAND.

APPARATUS FOR CUTTING LARD, BUTTER, OR MARGARINE.

Application filed January 21, 1926, Serial No. 82,725, and in Great Britain January 29, 1925.

This invention relates to apparatus for cutting or sub-dividing bulk or block lard, butter or margarine into blocks of uniform shape, size and weight.

According to the invention, the apparatus comprises a stationary base with a longitudinally grooved upper face thereto for the slidable and reversible reception therein of a board or carrier on which the block to be cut or sub-divided is placed, said carrier, which also constitutes the means for turning the block when required, being constituted by a three-part member hingedly connected together and provided with means for locking, when required, two of said parts together; a pusher block for detachable placement on the carrier, said pusher block being constituted by a two-part member hingedly and lockably connected together, a rectangular cutter frame pivotally connected by its legs to the base, a plurality of cutting wires carried by said frame and disposed transversely of the carrier, a central and detachable cutting wire, a paper cutter, means for locking the cutter frame in a vertical position or at any angle either side of the vertical, means for preventing any upward movement of the cutter frame when in its extreme right hand position, and a scraper for smoothing, scraping or levelling the block of lard or the like and adapted to be detachably carried by the cutter frame aforesaid.

For a clear understanding of the invention, reference is to be had to the following description and accompanying sheets of drawings, wherein:—

Figure 1 is a plan view, partly in section, of the apparatus in its collapsed condition, the scraper being removed therefrom.

Figure 2 is a side view, partly in section, of said apparatus.

Figure 3 is a side view of the apparatus in its working position ready to work, from right to left, to make the first series of cuts.

Figure 4 is a side view, partly in section, of said apparatus in its working position ready to work, from left to right, to make the second series of cuts, said figure showing also the pusher and the scraper.

Figure 5 is an end view of said Figure 4

Figure 6 is a perspective view of the pusher.

Figures 7 and 8 are vertical sectional views illustrative of the central cutter wire and the paper cutter.

Figures 9, 10 and 11 are diagrammatic views illustrative of the first cutting movement.

Figures 12, 13 and 14 are diagrammatic views illustrative of the turning over of the block after the first cut.

Figure 15 is a diagrammatic view showing the cutter frame swung over ready for the second cut, and pusher in position.

Figures 16, 17 and 18 are diagrammatic views illustrative of the second cutting movement.

Figure 19 is a view illustrative of a modification hereinafter referred to.

In the several figures, like numerals of reference indicate corresponding parts.

In carrying the invention into effect and referring to the drawings, to each wall 1 of the rectangular base 2, which walls and base constitute a groove, there is pivotally connected by its lower ends the rectangular cutter frame 3. Also, to said walls 1 and base 2, there is slidably mounted the three-part carrier 4, 4 and 5, the parts being hingedly connected together at 6, said parts 4, 4, which are separated from one another by a slit 7, being normally locked together at their outer ends by a catch 8 which is pivotally mounted by one end in a slot in one of said parts 4, and by its other end engaged in a slot in the other of said parts 4, said slit 7 opening into a recess 9 in the part 5 of said three-part carrier.

One side member of the frame 3 is provided with seven, or it may be more, equally spaced apart hooks 10, and to the other side member of said frame 3, and inside thereof, there is adjustably secured by thumb-nuts and screws 11, an auxiliary bar 12 which is fitted with a corresponding number of equally spaced apart hooks 13, and with said hooks 10 and 13 there engage the looped ends of the transverse cutter wires 14, the arrangement being such that by drawing the bar 12 towards the side member of the frame 3, by means of the nuts and screws 11, all said wires 14 are simultaneously tautened.

To each side of the base 2 aforesaid, and at a convenient distance from the pivots of the cutter frame 3, there is pivotally connected the lower end of a flat slotted bar 15 and through the slot there passes a screw 16 fixedly carried by the side member of the frame 3 for the purpose of holding said frame 3 rigid when in its adjusted inclined or vertical position by means of the wing nut 17 of said screw 16, see Figures 3, 4, 5, 7 and 8.

To each side of the base 2 and at a convenient distance from the right hand end thereof, there is pivotally mounted the lower end of a flat open-ended slotted bar 18, through the slot of said bar 18 is also passed the screw 16, so that when said bars 15 and 18 and the side members of the frame 3 are clamped together by means of the wing nut 17 of said screw 16, said frame 3 is held rigid against any tendency to upward movement when making the first cut, said bars 18 being of such a length that when not required, they can clear said screws 16 and be swung to rest alongside the base 2, as shown in Figures 1, 2 and 4 of the drawings.

The scraper (or smoother) whose object is to level the top or end of the block of fat, by the same being pushed to and fro previous to adjusting the cutter frame, and with it the cutting wires to the height required, consists, as shown in Figures 4 and 5, of bars 19 lockable at any angle and depending from the cutter frame 3 by thumbscrews 20, and bars 21 lockable at any angle to said bars 19 by thumb-screws 22, and a cutter or smoother 23 of metal or wood lockable by thumb-screws 24 at any angle to the bars 21 aforesaid, the frame 3, when the scraper or smoother 23 is in use, being swung to such a position and locked so that the cutting wires of said frame 3 will not touch the block of fat when the same is moved to and fro, the scraper or smoother when not required, being, as a whole, either removed or swung upwards out of the way.

In a slot 25 in the base 2 there is pivotally mounted a hook-shaped member 26 which in normal position is horizontally flush with the underside of the three-part board 4, 5 so as not to interfere with said board in its to and fro movements, see Figures 1 and 2, and with said hook-shaped member 26, which is provided with a cutting edge 27, there is adapted to engage in the manner and for the purpose set forth another cutting wire.

The pusher consists of a two-part block 28, 29 of wood or other suitable material hingedly connected together, as shown in Figure 6, and locked when in upright position by means of a turnbutton 30 mounted in the upper part of a recess 31 formed in said two parts 28, 29, suitable stops 32 being provided to limit the movement of said turnbutton 30, part 29 of said two-part block 28, 29 being provided with projections 33 adapted to take in slots 34 positions, as shown in Figure 1, between the hinges 6, 6 which hinge the parts 4, 4 to the part 5 of the three-part board.

The slots 34 are constituted by the spaces between each pair of hinges 6, 6 and the plates 6ª which extend right across the ends of and secured to the parts 4, 4 and 5 of the three-part board, as shown in Figure 1 of the drawings, and ensure the rigid holding of the pusher block 28, 29 when the projections 33 of said pusher block are in said slots 34, this arrangement not only allowing of the reversal of the pusher block but also preventing the wearing of said projections and the edges of the parts of the three-part board which would obtain if said edges were not protected by the plates 6ª.

In use, and when working from left to right, a block 35 of lard, say 28 lbs. weight, and cleaned of its usual wrapper except at the end nearest to, and touching the pusher board, and the side, or bottom, upon which it lies on the pusher board is made ready for cutting. The paper at the bottom is cut away by the hooked knife, and that on the end falls away when the pusher board is withdrawn. The block is placed longways up on the two-part 4, 4 of said board, and is scraped or smoothed by pushing or pulling said board to and fro under the scraper 23, which is then either removed or swung out of the way, and if it is to be a seven-cut, then the seventh or uppermost wire 14 of the frame 3 is brought level with the top of said block 35 by swinging the frame 3 to the right of the perpendicular, as in Figures 3 and 9, said frame 3 and the side bars 15 and 18 being then locked in such position by tightening up the wing nuts 17 of the screws 16, thus holding said frame 3 and bars 15 and 18 rigidly together and any tendency of the frame to move upward prevented.

The two-part pusher board 28, 29 is, by its projections 33, inserted in the slots 34 formed between the hinges 6 on the board 4, 4 and 5, and the actual space between said boards, and close up against the block of lard 35, as shown in Figure 9.

The operator's hand is then placed against the back of the pusher block 28, 29 and the whole as far as possible pushed through the wires 14 of the cutter frame. This will be till the top of the pusher block 28, 29 is up to a wire 14, whereupon the button 30 of the pusher block 28, 29 is turned so that the part 28 of said pusher block 28, 29 can be turned down, as shown in Figure 10. The push is then continued till the part 29 of said pusher block 28, 29 is up to another wire 14, whereupon said pusher block 28, 29 is taken out, folded and then laid flat, as shown in Figure 11, and the final cut is then made by pushing the block 35 clear of the lowermost wire, as shown in dot-and-dash lines Figure 3, and in diagram Figure 12, with the result that there obtains seven cuts of four pounds each.

The carrier board 4, 5 and with it the block 35 is then drawn clear of the cutter frame 3, the pusher block 28, 29 is then removed and the parts or sections of the board 4, 5 are lifted up on their hinges 6 to a position at right angles to one another, so that the block 35 on its long-way up is cradled therebetween, as shown in diagram Figure 13, whereupon the whole is carefully swung over so that the board 5 is flat on the base 2, block 35 resting by its long side on said board 5 with the cuts made standing in vertical position, as shown in Figure 14.

The board 4, 4 is then turned down, and the two-part pusher block 28, 29 is then fixed in position on the board and against the block 35 in an upright position by inserting the projections 33 of said pusher block 28, 29 into the slots 34 of the board 4, 5, said parts 28, 29 being locked together in upright position by means of the turnbutton 30.

The wing nuts 17 of the screws 16 are then slackened and the frame 3 and with it the slotted bars 15 are swung to the left of the perpendicular, the slotted side bars 18 slipping the screws 16 to bring the fourth wire 14 of the frame 3 level with the top of the block 35, as shown in Figures 4 and 15, whereupon the frame is locked in such position.

The operator's hand is then placed against the pusher block 28, 29 and the board, and with it the block 35, is then pushed along the grooved base 2 till it meets the third wire 14, making a full first cut and part second and third cuts, as in Figure 16, whereupon the turnbutton 30 is turned to allow the top part 28 of the pusher block 28, 29 to be turned down against the part 29 of said pusher block, as in said Figure 16, and the board, and with it the block 35, is then pushed along till the part 29 of the pusher block comes against the second wire, making full the second cut and increasing the third cut, as in Figure 17, whereupon the pusher block 28, 29 is removed and then placed, folded up, flat on the board and against the block 35 with the tongues 33 extended rearwardly, and the board is then further pushed along till the first wire of the frame 3 has completed the third cut, the pusher block passing beneath said wire, as shown in Figures 4 and 18, cutting the block 35 into twenty-eight pound blocks.

Although the apparatus has been described as working from right to left, it can be equally well worked from left to right, the position of the cutter frame being altered accordingly, but it cannot be worked in such manner if a central cut is required.

If half-pounds, or denominations of these are required, then the locking catch 8 is swung open. The cutter frame 3 is temporarily locked in vertical position, as shown in Figures 7 and 8; the hooked knife 26 is raised into a vertical position in the recess 25 of the base 2 by depressing the tail of said hooked knife 26, said tail end engaging against a stop, 25$^a$, located in said recess 25 to maintain the hooked-knife 26 in upright position when raised. To the hook of said knife 26 is affixed one end of a spare wire 36 which, by its other end is affixed to the hooked end of a screw 37 passed through the top member of the frame 3 and centrally on said top member, the wire 36 being tautened by means of a wing nut 38 screwed down said screw and against said top member of said frame.

The block 35, with the usual paper wrapper left on the lower side only, is made central on the board 4, 4 and the frame 3 is swung over till the fourth wire thereof is level with the top of the block 35 on its flat side and the frame 3 is then locked in such position. The pusher block 28, 29 is then reversed in the slots 34, and, using the pusher block 28, 29 in the manner previously described, the block 35 is pushed through the frame 3, resulting in fifty-six approximately true cuts of half a pound each.

It is preferable to work from left to right and with the block 35 on its long end, as it is better to finish up with the greater number of cuts as there might be some risk of a number of pieces of lard falling apart during the turning over movement of the block 35 and the machine is so designed that the centre cut can only be made from one side, the right to left. The knife edge 27 meets and cuts the paper under block 35 only that one way, as well as the frame 3 being swung to the left causes the wire 36 to work from the axis of the cutter 26, the wire 36 following the inclination of the frame.

The central cuts having been made, and when the block is clear of the frame 3, the central wire 36 is taken off by easing first the top hook 37 and unhooking said wire 36 from the cutter 27 through the hole 9 in the board 4, 5, and by simply pushing the board and with it the block 35 further along, said cutter 27 is automatically depressed by the board into its recess 25 in the base 2. The catch piece 8 is then swung back into its normal position, closing the slit 7 between the parts 4, 4 of the board 4, 5, making said board as one again on which the whole cut block still rests.

The centre wire 36, when not required, may be attached in any convenient manner to the base 2 of the apparatus.

Marks 40 to centralize the block on the slidable board 4, 5 and arranged at suitable distances on either side of the longitudinal centre of the board may be provided, as shown in Figure 1.

Instead of the scraper described and shown in Figures 4 and 5 of the drawings, use may be made of a loose and interchangeable (as to position) blade 23$^a$ adapted, as shown in Figure 19, to be dropped by its ends 41 into slots 42 made in the one side member of the frame 3 and the auxiliary bar 12 and inwards of the same, so as to be level with any wire, more particularly the eighth, seventh and fourth, counting bottom wire as one, when the cutter frame 3 is swung at any angle, so that any fat whose top side requires smoothing is smoothed at the same time as the cuts are being made which ever way up said fat is being cut.

I claim:—

1. Apparatus for cutting or sub-dividing blocks of lard or the like, into blocks of uniform size and weight, said apparatus consisting of a stationary grooved base, a three-part board with the members hingedly connected together, and slidably mounted in said grooved base, slots formed between the hinges which connect the members of the board, a pusher block provided with projections for insertion into said slots, a cutter frame pivotally connected to the walls of the groove of the base, horizontal cutting wires carried by said frame, means for tautening said wires, means for supporting and locking said frame in adjusted position either side of the perpendicular, means for supporting and locking said frame and said supporting means when in their extreme right hand position, and means for scraping or smoothing the block prior to the cutting or sub-dividing thereof.

2. Apparatus as claimed by claim 1, characterized in that the pusher block consists of two-members hingedly connected together, said members being recessed adjacent their hinged edges, a turnbutton on one face positioned in said recess and adapted to span said hinged edges so that when said turnbutton is disengaged, one member of said block may be swung down flat against the other, and when engaged, holds said members rigidly together, one of said members being fitted with projections for the purpose set forth.

3. Apparatus as claimed by claim 1, characterized in that the scraping or smoothing means consist of an articulated adjustable and lockable framework adapted to be adjustably and lockably and detachably supported from the cutter frame and fitted with a smoothing blade.

4. Apparatus as claimed by claim 1, characterized in that the adjustable and supporting and locking means for the cutter frame consist of oppositely disposed closed ended slotted bars pivotally mounted on the walls of the groove of the base and at a convenient point to the left of the pivots of said cutter frame, and oppositely disposed open-ended slotted bars pivotally mounted on the wall of the groove of the base and at a convenient point to the right of the pivots of the cutter frame, and screws with wing nuts carried by the side members of the cutter frame to lock the parts together, said open-ended slotted bars being of such a length as to clear the screws aforesaid and be swung down alongside the base when said cutter frame and closed ended slotted bars are swung to the left of the perpendicular.

In testimony whereof I have affixed my signature hereto this 7th day of January, 1926.

MARK BAKER.